United States Patent [19]

Gray et al.

[11] Patent Number: 4,970,486
[45] Date of Patent: Nov. 13, 1990

[54] FOOT OPERATED CONTROL PRODUCING ELECTRICAL SIGNALS

[75] Inventors: Thomas J. Gray, Waukesha; Mark W. Lampark, Racine, both of Wis.

[73] Assignee: Quadrastat Corporation, City of Industry, Calif.

[21] Appl. No.: 418,100

[22] Filed: Oct. 6, 1989

[51] Int. Cl.⁵ .................................................. G01L 1/22
[52] U.S. Cl. ........................................ 338/2; 338/108; 338/153; 73/862.65
[58] Field of Search ........................ 338/2, 5, 108, 153, 338/215; 74/512, 513, 514, 560, 561; 73/862.65, 379; 244/196

[56] References Cited

U.S. PATENT DOCUMENTS

| | | | |
|---|---|---|---|
| 505,063 | 12/1893 | Ramien | 338/153 X |
| 508,692 | 11/1893 | Fiske | 338/153 X |
| 2,909,764 | 1/1959 | Chambers | 340/177 |
| 2,943,480 | 7/1960 | Nelting | 73/88.5 |
| 3,124,770 | 3/1964 | Ciavatta | 338/5 |
| 3,234,787 | 2/1966 | Ruge | 73/141 |
| 3,454,920 | 7/1969 | Mehr | 338/5 |
| 3,513,431 | 5/1970 | Kovacs | 338/5 |
| 3,576,302 | 4/1971 | Palfreyman | 244/83 |
| 4,046,005 | 9/1977 | Goroski | 73/133 |
| 4,554,920 | 11/1985 | Baker, Jr. et al. | 128/419 |
| 4,888,997 | 12/1989 | Eckert et al. | 73/862.65 |

Primary Examiner—Bruce A. Reynolds
Assistant Examiner—Marvin M. Lateef
Attorney, Agent, or Firm—Michael, Best & Friedrich

[57] ABSTRACT

A foot operated control device including electrical force sensing devices functional to sense forces applied to the control device and to produce electrical signals proportional to the force applied, the electrical signals being adapted to operate electrically responsive hydraulic control valves.

9 Claims, 1 Drawing Sheet

FOOT OPERATED CONTROL PRODUCING ELECTRICAL SIGNALS

FIELD OF THE INVENTION

The present invention relates to foot operated controls for machines and vehicles and more particularly to foot operated controls which produce electrical control signals.

BACKGROUND PRIOR ART

Machines such as end loaders, back hoes, mobile cranes and the like commonly include hydraulic drive motors for propelling the machines and hydraulic cylinders for effecting movement of various movable implements or work pieces of the machines. The hydraulic drive motors and hydraulic cylinders are commonly controlled by manually operated hydraulic control valves such as foot pedals or control levers mechanically coupled to the control valves.

In one prior arrangement illustrated in U.S. Pat. No. 3,576,302, issued Apr. 27, 1971, a foot pedal of an aircraft is used to produce solid state electrical signals which can, in turn, be used to control operation of components of the aircraft.

Attention is also directed to rigid joystick control devices of the type for producing electrical control signals, such as rigid joysticks illustrated in U.S. Pat. No. 4,046,005, issued Sept. 6, 1977 to Goroski and U.S. Pat. No. 3,454,920, issued July 8, 1969 to Mehr. Attention is further directed to U.S. Pat. No. 2,909,764, issued Oct. 20, 1959 to Chambers; U.S. Pat. No. 2,943,480, issued July 5, 1960 to Nelting; U.S. Pat. No. 3,124,770, issued Mar. 10, 1964 to Ciavatta; U.S. Pat. No. 3,234,787, issued Feb. 15, 1966 to Ruge; U.S. Pat. No. 3,513,431, issued May 19, 1970 to Kovacs; and U.S. Pat. No. 4,554,920, issued Nov. 26, 1985 to Baker.

SUMMARY OF THE INVENTION

The invention includes a foot operated control device for use in a machine, vehicle or electrical apparatus, the foot operated control device including means for producing an electrical signal in response to the operator's application of force to the control, the electrical signal being proportional to the amount of force applied to the control. In one embodiment of the invention the foot operated control includes a foot support plate or platform having a forward portion and a rearward portion, a rigid generally vertical support structure having an upper end rigidly joined to the foot support plate and supporting the foot support plate. At least one strain gauge or similar electrical force measurement device is fixed to the vertical support structure and provides an electrical signal in response to application of force to the support plate, the electrical signal generated by the strain gauge being proportional to the force applied to the support plate.

The foot operated control apparatus of the invention can provide very accurate electrical control signals which can be supplied to electrically actuated hydraulic control valves and thereby provide for accurate control over hydraulic drive motors or other hydraulic components. The foot operated control embodying the invention also provides such control over the hydraulic components while providing a control which has no moving parts and which is very wear resistant, durable and resistant to damage from misuse.

Various other features and advantages of the invention will be apparent by reference to the following description of a preferred embodiment, from the drawings and from the claims.

DESCRIPTION OF A PREFERRED EMBODIMENT

Figure 1:
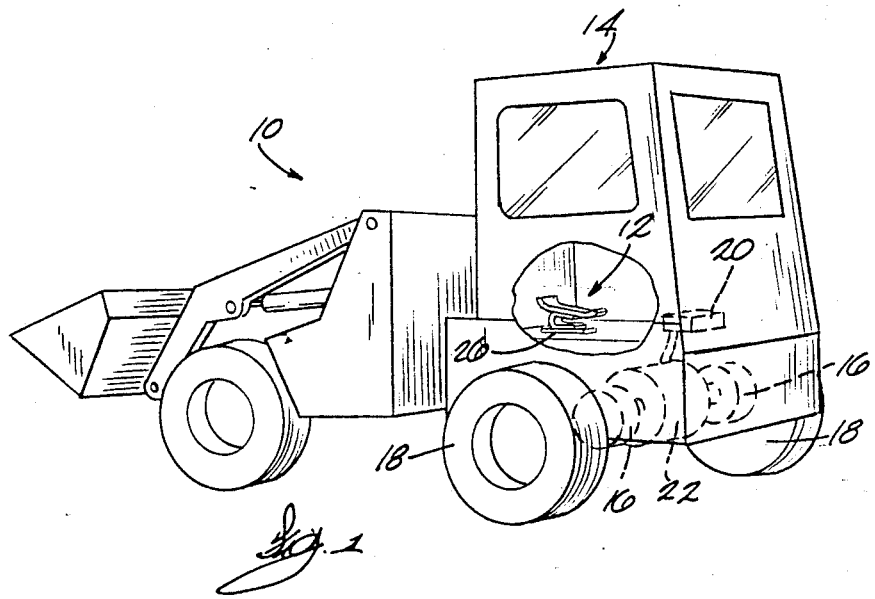
FIG. 1 is a perspective view of a machine including a foot operated control embodying the invention.

Illustrated in FIG. 1 is an end loader 10 including a foot operated control 12 embodying the invention, the foot operated control 12 being fixed in place in a position in the cab 14 of the end loader wherein the operator can place his foot on the foot operated control 12 and provide control signals for operation of the vehicle drive motors 16 or other hydraulically driven components of the end loader 10. It will be understood by those skilled in the art that the foot operated control 12 embodying the invention could be used in a number of applications other than in end loader 10 and would be useful in any machine or vehicle wherein it is desired to provide electrical control signals using a foot operated control device.

In the illustrated arrangement the end loader 10 can include hydraulic drive motors 16 coupled to the drive wheels 18 of the end loader and electrically actuated control valves 20 can be provided for controlling the supply of hydraulic fluid from a hydraulic fluid pump 22 to the hydraulic drive motors 16, the electrically actuated control valves 20 controlling the direction of the drive motors 16 and the speed of the drive motors. The electrically operated control valves 20 for use in controlling operation of the hydraulic drive motors 16 are conventional and are not illustrated in detail. The foot operated control 12 is operably connected to the electrically operated control valves 20 to provide electrical control signals to the electrically operated control valves, the electrical signals being proportional to the force supplied by the operator on the control 12.

Figure 2:
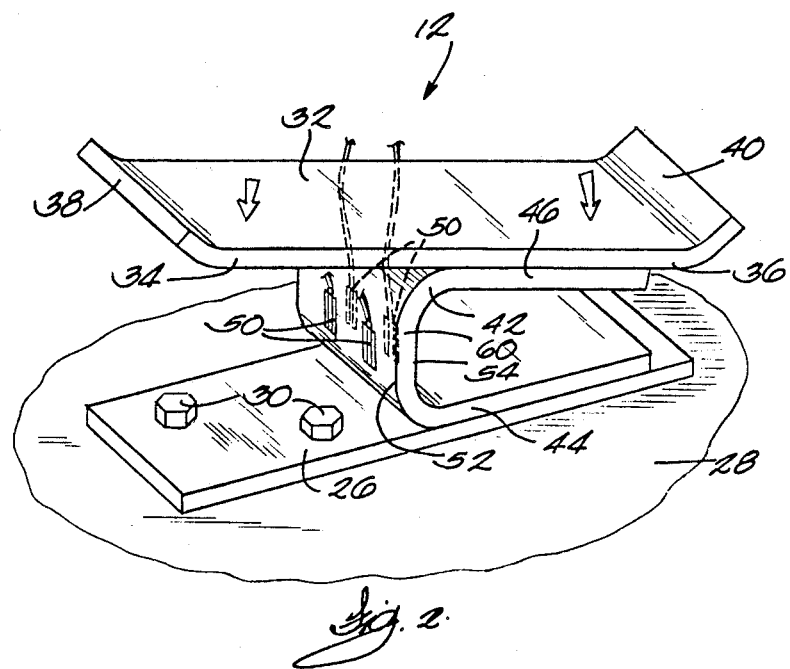
FIG. 2 is an enlarged perspective view of the foot operated control illustrated in FIG. 1.

As illustrated in FIG. 2, the foot operated control 12 includes a base 26 adapted to be fixed to a supporting surface 28. In the illustrated arrangement the base 26 comprises a plate adapted to be anchored to the supporting surface 28, and the plate 26 is secured to the floor or frame by bolts 30. The foot operated control 12 also includes a foot support plate or platform 32 adapted to support the operator's foot and having a cantilevered forward end 34 and a cantilevered rearward end 36. In the illustrated arrangement, the foot support plate 32 includes upwardly curved forward and rearward end portions 38 and 40, respectively, to aid the operator in properly positioning his foot on the support plate 32.

The foot support platform is supported intermediate its opposite ends by a support structure 42, the support structure 42 being substantially rigid and including a lower end 44 rigidly fixed to the support plate 26 and an upper end 46 fixed to the foot support platform 32 and supporting the foot support platform.

At least one strain gauge or electrical force sensing device 50 is fixed to the suPport structure 42 so as to produce electrical signals in response to loads being applied to the support structure when the operator applies a downward force on the forward or rearward portion of the foot support plate 32. In a preferred form of the invention, the support structure 42 includes a forward vertical surface 52 and a rearward vertical surface 54, and strain gauges 50 are fixed to both the forward and rearward vertical surfaces. The strain gauges 50 will produce electrical signals proportionate to the force applied by the operator on the forward end 34 of the foot support platform 32 and applied by the operator on the rearward end 36 of the foot support platform. The electrical signals generated by the strain gauges 50 can be transmitted to electrical control valves 20 to thereby accurately control operation of those valves. The strain gauges 50 employed as force sensing devices and for producing electrical signals responsive to the forces applied to the foot support platform can comprise foil strain gauges, photo-applied material sensing devices, vapor deposition sensing devices, laser edged force sensing devices or ceramic mounted force sensing devices.

Referring more particularly to the support structure 42 illustrated in the drawings for supporting the foot support plate 32, it includes a generally U-shaped member having a generally flat horizontal leg portion 44 adapted to be fixed to the support plate 26 and supported on the upper surface of the support plate. The leg portion 44 can be welded to the support plate or secured thereto by mechanical fasteners. In the illustrated construction, the support structure also includes an upper leg portion 46 which is generally planar and positioned beneath the rearward portion 36 of the foot support plate, the rearward portion 36 of the foot support plate being welded or otherwise fixed to the upper leg portion 46. In the illustrated arrangement the upper leg portion 46 has a width the same as the width of the support plate 32 and the lower leg portion 44 similarly has a width approximately the same as the support plate 26. The support structure also includes a bite portion or web 60 extending between the lower leg portion 44 and the upper leg Portion 46, the bite portion defining the opposed generally vertical surfaces 52 and 54 adapted to support the strain gauges or other sensitive electrical generating means. In the illustrated arrangement, the support structure is comprised of a material and has a material thickness in the area of the bite Portion 60 that is substantially rigid but will bend slightly in response to force on the foot support plate 32 by the operator. The support structure 42 should be sufficiently rigid that it will not be bent or otherwise damaged by excessive weight being applied to it, yet it should be sufficiently flexible so as to facilitate generation of electrical signals by the strain gauges mounted on the forward and rearward faces of the support structure with the strain gauges producing electrical signals proportionate to the amount of force applied to the foot support plate.

We claim:

1. A foot operated control comprising:
    a base;
    a foot support platform having a forward portion and a rearward portion;
    a vertically extending rigid support member having a forward surface and a rearward surface and having upper and lower ends, said lower end rigidly fixed to the base and said upper end rigidly fixed to the foot support platform intermediate the forward portion and the rearward portion; and
    means for producing an electrical signal proportionate to the force applied to the forward portion of the foot support platform when a force is applied to the forward portion of the foot support platform and for producing an electrical signal proportionate to the force applied to the rearward portion at the foot support platform when a force is applied to the rearward portion of the foot support platform, the means for producing electrical signals including at least one electrical force sensing device fixed to the vertically extending rigid support member.

2. A foot operated control device as set forth in claim 1 wherein the electrical force sensing device is fixed to said vertically extending rigid support member intermediate the upper and lower ends of said vertically extending rigid support member.

3. A foot operated control as set forth in claim 1 wherein said electrical force sensing device comprises a strain gauge.

4. A foot operated control as set forth in claim 3 wherein said means for producing electrical signals includes a plurality of strain gauges fixed to the rigid support member.

5. The combination of claim 1 wherein said sensor means includes strain gauge means attached to said flexure means to be strained in response to said differential flexing of the flexure means.

6. The combination of claim 5 wherein said flexure means comprises a web having a front side and a rear side, and said strain gauge means includes multiple strain gauges attached to said front and rear sides.

7. The combination of claim 6 including electrical circuit means incorporating said strain gauges to pass current through the gauges whose resistivity is changed in response to said flexing.

8. The combination of claim 6 wherein said flexure means includes a channel shaped member having a bottom flange rigidly attached to the base, a top flange rigidly attached to the platform, and said web interconnecting said flanges.

9. In a foot operated control device, the combination comprising:
    (a) a base;
    (b) a foot support platform extending generally forwardly and rearwardly;
    (c) vertically extending flexure means fixedly supporting the platform above the level of the base for tilting of the platform alternately forwardly and downwardly or rearwardly and downwardly in response to selective foot applied force to the platform;
    (d) and sensor means associated with the flexure means to sense differential flexing thereof in response to said platform tilting forwardly and downwardly, and rearwardly and downwardly.

* * * * *